United States Patent
Huang

(10) Patent No.: US 9,603,030 B2
(45) Date of Patent: Mar. 21, 2017

(54) CELL ID ALLOCATION IN A HETEROGENEOUS NETWORK

(71) Applicant: Emprie Technology Development LLC, Wilmington, DE (US)

(72) Inventor: Anpeng Huang, Beijing (CN)

(73) Assignee: Emprie Technology Development LLC, Wilmington, DE (US)

( * ) Notice: Subject to any disclaimer, the term of this patent is extended or adjusted under 35 U.S.C. 154(b) by 0 days.

(21) Appl. No.: 14/438,521

(22) PCT Filed: Mar. 13, 2014

(86) PCT No.: PCT/CN2014/073330
§ 371 (c)(1),
(2) Date: Apr. 24, 2015

(87) PCT Pub. No.: WO2015/135167
PCT Pub. Date: Sep. 17, 2015

(65) Prior Publication Data
US 2016/0255512 A1    Sep. 1, 2016

(51) Int. Cl.
*H04W 8/26* (2009.01)
*H04W 16/32* (2009.01)
(Continued)

(52) U.S. Cl.
CPC ............ *H04W 16/32* (2013.01); *H04W 8/26* (2013.01); *H04W 16/02* (2013.01); *H04W 24/02* (2013.01); *H04W 72/0453* (2013.01)

(58) Field of Classification Search
CPC . H04W 36/0083; H04W 16/32; H04W 36/04; H04W 40/248; H04W 48/08;
(Continued)

(56) References Cited

U.S. PATENT DOCUMENTS 7,835,740 B2    11/2010  Claussen et al.
2008/0146226 A1*  6/2008  Claussen ............... H04W 36/04
                                        455/435.1
(Continued)

FOREIGN PATENT DOCUMENTS

| CN | 101574001 A | 11/2009 |
|---|---|---|
| CN | 101772148 A | 7/2010 |
| CN | 103260151 A | 8/2013 |

OTHER PUBLICATIONS

Damnjanovi, A., et al., "UE's role in LTE advanced heterogeneous networks," IEEE Communications Magazine, vol. 50, No. 2, pp. 164-176 (Feb. 2012).
(Continued)

*Primary Examiner* — Quan M Hua
(74) *Attorney, Agent, or Firm* — Brundidge & Stanger, P.C.

(57) ABSTRACT

In a heterogeneous cellular communication network, a macro cell equipped with a base station may be configured to support one or more macro user equipment (UE) and one or more micro cells, each of which further serves as proxies of one or more micro UE for wireless communications between the micro UE and the macro cell. The base station may be configured to assign a first cell ID to the macro cell and other cell IDs that have a mathematical distinction from the first cell ID to the micro cells.

17 Claims, 4 Drawing Sheets

(51) Int. Cl.
    *H04W 16/02* (2009.01)
    *H04W 24/02* (2009.01)
    *H04W 72/04* (2009.01)

(58) Field of Classification Search
    CPC ............. H04W 48/16; H04W 36/0061; H04W
            36/0072; H04W 72/0406; H04W 92/20;
            H04W 16/00; H04L 5/0048; H04L
            5/0053; H04L 5/0073; H04L 25/03866;
            H04J 11/0069; H04J 13/18; H04J 13/22
    See application file for complete search history.

(56) References Cited

U.S. PATENT DOCUMENTS

| | | | | |
|---|---|---|---|---|
| 2010/0105395 | A1* | 4/2010 | Ji | H04W 4/20 |
| | | | | 455/444 |
| 2010/0210273 | A1* | 8/2010 | Jun | H04W 24/02 |
| | | | | 455/450 |
| 2011/0194534 | A1 | 8/2011 | Carmon et al. | |
| 2014/0098795 | A1* | 4/2014 | Takeda | H04J 13/16 |
| | | | | 370/335 |

OTHER PUBLICATIONS

International Search Report and Written Opinion for counterpart International Patent Application No. PCT/CN2014/073330 mailed Dec. 19, 2014.

Landström, S., et al., "Heterogeneous networks—increasing cellular capacity," Ericsson review, pp. 1-6 (Feb. 11, 2011).

Lindbom, L., et al., "Enhanced Inter-cell Interference Coordination for Heterogeneous Networks in LTE-Advanced: A Survey," arXiv:1112.1344 [cs.IT], pp. 1-18 (Dec. 7, 2011).

Mustaqim, M., et al., "LTE-Advanced: Requirements and Technical Challenges for 4G Cellular Network," Journal of Emerging Trends in Computing and Information Sciences, vol. 3, No. 5, pp. 665-671 (May 2012).

* cited by examiner

CELL ID ALLOCATION IN A HETEROGENEOUS NETWORK

CROSS-REFERENCE TO RELATED APPLICATION

This Application is the U.S. National Stage filing under 35 U.S.C. §371 of PCT Application Ser. No. PCT/CN2014/073330 filed on Mar. 13, 2014. The disclosure of the PCT Application is hereby incorporated herein by reference in its entirety.

TECHNICAL FIELD

The technologies described herein pertain generally to cell ID allocation in a heterogeneous cellular communication network.

BACKGROUND

Unless otherwise indicated herein, the approaches described in this section are not prior art to the claims in this application and are not admitted to be prior art by inclusion in this section.

In a heterogeneous cellular communication network, user equipment may be unevenly distributed in different locations. For example, there may be more user equipment in office buildings, movie theaters, or shopping malls than those in parking lots, parks, or on highways. Thus, one or more micro cells within coverage of a macro cell may be distributed in crowded areas and configured to serve as proxies of one or more micro UE in the crowded areas for communications between the micro UE and the macro cell. The macro cell equipped with a base station may be configured to support one or more macro user equipment (UE) and the micro cells.

SUMMARY

Technologies are generally described for cell ID allocation in a heterogeneous network. The various techniques described herein may be implemented in various systems, methods, computer programmable products, and/or computer-readable mediums.

In some examples, various embodiments may be implemented as systems. Some systems may include a macro cell in which wireless communications are hosted for a first set of mobile devices and multiple low power nodes that serve as proxies for a second set of mobile devices; and a cell ID allocator configured to identify a series of numeric values as multiple candidate cell IDs, randomly select a first cell ID, from the multiple candidate cell IDs, for the macro cell, identify a subset of the multiple candidate cell IDs associated with the first cell ID, and allocate a cell ID for each of the multiple low power nodes that has a mathematical distinction from the identified subset of the multiple candidate cell IDs.

In some examples, various embodiments may be implemented as methods. Some methods may include identifying a macro cell and multiple low power nodes; identifying a series of numeric values as multiple candidate cell IDs; randomly selecting a first cell ID, from the multiple candidate cell IDs, for the macro cell; identifying a subset of the multiple candidate cell IDs associated with the first cell ID; and allocating a cell ID for each of the multiple low power nodes that has a mathematical distinction from the identified subset of the multiple candidate cell IDs.

In some examples, various embodiments may be implemented as computer-readable mediums having executable instructions stored thereon. Some computer-readable mediums may store instructions that, when executed, cause one or more processors to perform operations comprising identifying a macro cell and multiple low power nodes; identifying a series of numeric values as multiple candidate cell IDs; calculating, for each of the multiple candidate cell IDs, a remainder of division of the candidate cell ID by a predetermined number; randomly selecting a first cell ID, from the multiple candidate cell IDs, for the macro cell; dividing the multiple candidate cell IDs into a number of groups that is equal to the predetermined number; identifying, from the number of groups, a subset of the multiple candidate cell IDs associated with the first cell ID; and allocating a cell ID for each of the multiple low power nodes that is mathematically distinct from the identified subset of the multiple candidate cell IDs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
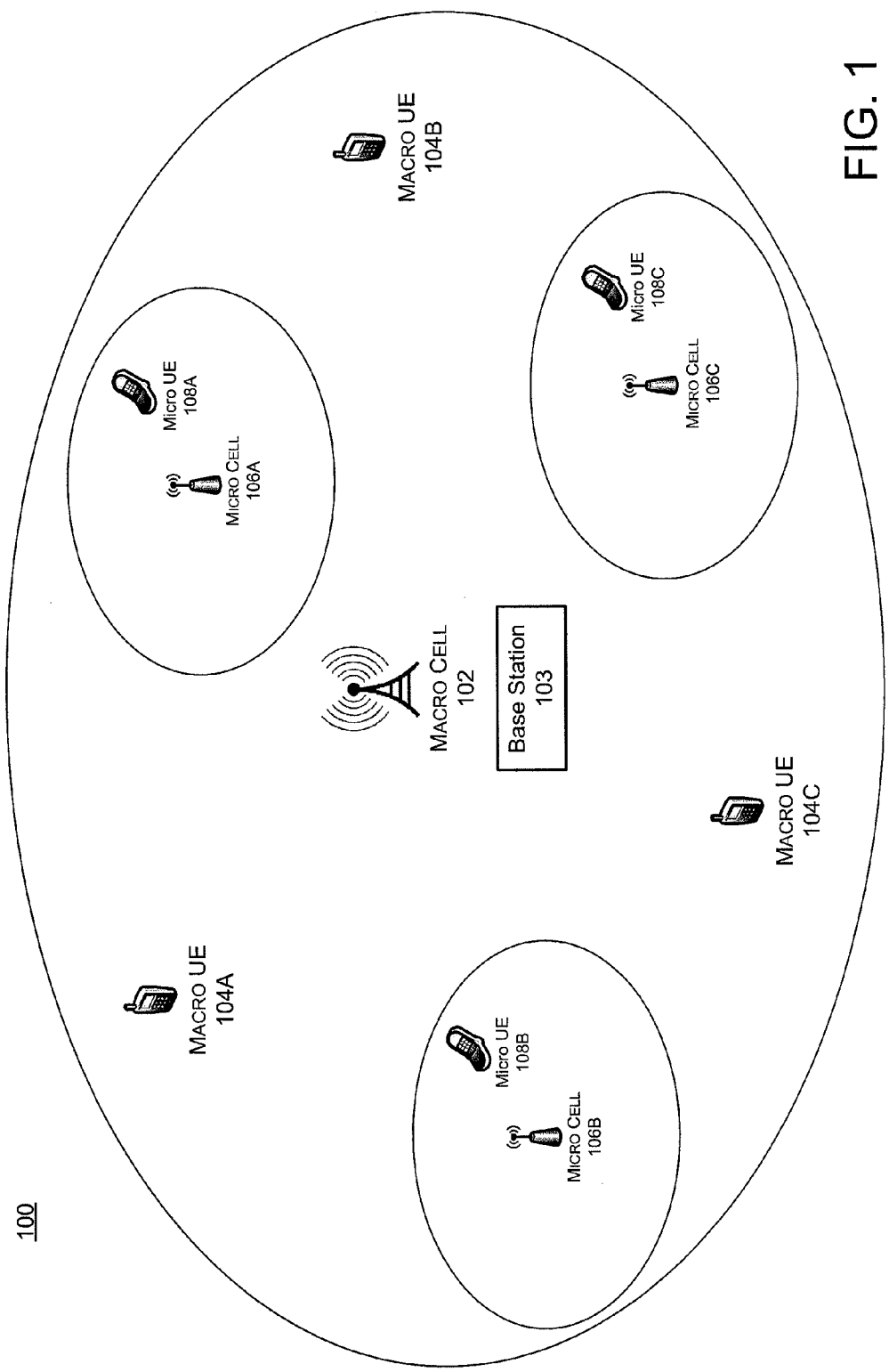
FIG. 1 shows an example system in which cell ID allocation in a heterogeneous network may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which cell ID allocation may be implemented, arranged in accordance with at least some embodiments described herein. As depicted, example system 100 may include, at least, a macro cell 102 equipped with a base station 103, one or more macro UE 104A-104C, one or more micro cells 106A-106C, and one or more micro UE 108A-108C. Unless context requires specific reference to one or more of macro UE 104A-104C, collective reference may be made to "macro UE 104" below. Similarly, collective reference may be made to "micro cells 106" and "micro UE 108."

Macro cell 102 may refer to a range of radio coverage equipped with base station 103 in a respective cellular network. Macro cell 102 may be configured to provide wireless communication for macro UE 104 and micro cell 104, which further serves as proxies to provide wireless communication for micro UE 108.

Base station 103, commonly referred to as "eNB" in a long term evolution (LTE) system, may refer to a combination of hardware, firmware, or software components configured to support wireless communications between macro UE 104, micro cells 106, and, further, other embodiments of macro UE 104 and micro cells 106 in one or more adjacent cells of the respective cellular work. Such communication may be in accordance with different wireless communication standards including Time Division Duplex Long Term Evolution (TDD-LTE), Frequency Division Duplexing (FDD-LTE), IEEE 802.15.4, Global System for Mobile Communications (GSM), General packet radio service (GPRS), Code Division Multiple Access (CDMA), 3rd generation of mobile telecommunications technology (3G), and etc., which may further determine the work mode of the respective user equipment. Such examples are not intended to be limiting and, therefore, should not be interpreted to be so.

Macro UE 104 may refer to one or more mobile (or portable) electronic devices capable of transmitting and receiving wireless signals from base station 103, such as a mobile phone, smartphone, personal digital assistant (PDA) a personal media player device, an application specific device, or a hybrid device that includes any of the above functions. Alternatively, macro UE 104 may be implemented as a personal computer including tablet, laptop computer, non-laptop computer configurations, etc.

Micro cells 106 may refer to one or more ranges of radio coverage located within the coverage of macro cell 102. Micro cells 106 may serve as proxies for the wireless communications between micro UE 108 and base station 103. The radio coverage of micro cells 106 may be smaller than that of macro cell 102 since micro cells 106 may be equipped with physical nodes of lower transmitting power, which may be referred to as low power nodes. In at least some examples, micro cells 106 may be located in the areas where high volumes of transmission activities occur, such as shopping malls, office buildings, stadiums, etc. With the implementation of micro cells 106, the throughput and the overall network efficiency of example system 100 may be improved. Since example system 100 may include cells of different coverage, the cellular network that includes example system 100 may be referred to as "heterogeneous."

Similar to macro UE 104, micro UE 108 to one or more mobile (or portable) electronic devices capable of transmitting and receiving wireless signals from micro cells 106, such as a mobile phone, smartphone, personal digital assistant (PDA) a personal media player device, an application specific device, or a hybrid device that includes any of the above functions. Alternatively, micro UE 108 may be implemented as a personal computer including tablet, laptop computer, non-laptop computer configure configurations, etc. Each of micro UE 108 may be located in respective one of micro cells 106.

In at least one example, in addition to the wireless signals that carry communication data, base station 103 may be configured to transmit one or more common reference signals (CRS) to macro UE 104 so that macro UE 104 may estimate one or more characteristics of a corresponding communication channel. Similarly, the low power nodes of micro cells 106 may also be configured to transmit CRS to micro UE 108 for the same purpose. With respect to both macro cell 102 and micro cells 106, the transmission of CRS may be allocated to a frequency band that corresponds to a cell ID that is selected from a plurality of candidate cell IDs, e.g., 0-503 in an LTE system. The frequency band, in an LTE system, may be determined by a mathematical trait, such a remainder of division of the cell ID by a predetermined number, e.g., the predetermined number is standardized as three (3) in an LTE system. For example, when three cell IDs, e.g., 100, 101, and 102, are assigned to three cells respectively, each cell may be allocated with a different frequency band to transmit CRS since the remainders of division of the three cell IDs by 3 are different, i.e., 1, 2, and 0, respectively. In other words, a same frequency band may be allocated to one or more cells if the cells ID have a same remainder when divided by 3.

To avoid potential interferences between different cells due to the same frequency band, different cells may be allocated to different frequency bands in transmitting the CRS. Since the frequency bands are determined by cell IDs of the cells, a cell ID allocator may be configured to allocate cell IDs with different mathematical traits to each of the cells. That is, a cell ID allocator of base station 103 may be configured to first identify a series of numeric values as multiple candidate cell IDs and to randomly select a first cell ID, from the multiple candidate cell IDs, for macro cell 102. For example, macro cell 102 may be assigned with a cell ID from 0-503, e.g., 99. The cell ID allocator may be configured to then identify a subset of the multiple candidate cell IDs associated with the first cell ID, e.g., a subset of the multiple candidate cell IDs that have a same remainder of division by 3 (90, 93, 96, 102, etc.). The cell IDs for micro cells 106 may then be selected from other candidate cell IDs excluding the identified subset so that the cell IDs for micro cells do not have the same remainder of division as the first cell ID. Thus, the frequency band for the transmission of CRS allocated for micro cells 106 may be different from the frequency band for macro cell 102.

Thus, example system 100 shows macro cell 102, equipped with base station 103, configured to provide wireless communications for macro UE 104 and micro cells 106, which further serve as proxies to provide wireless communication for micro UE 108.

Figure 2:
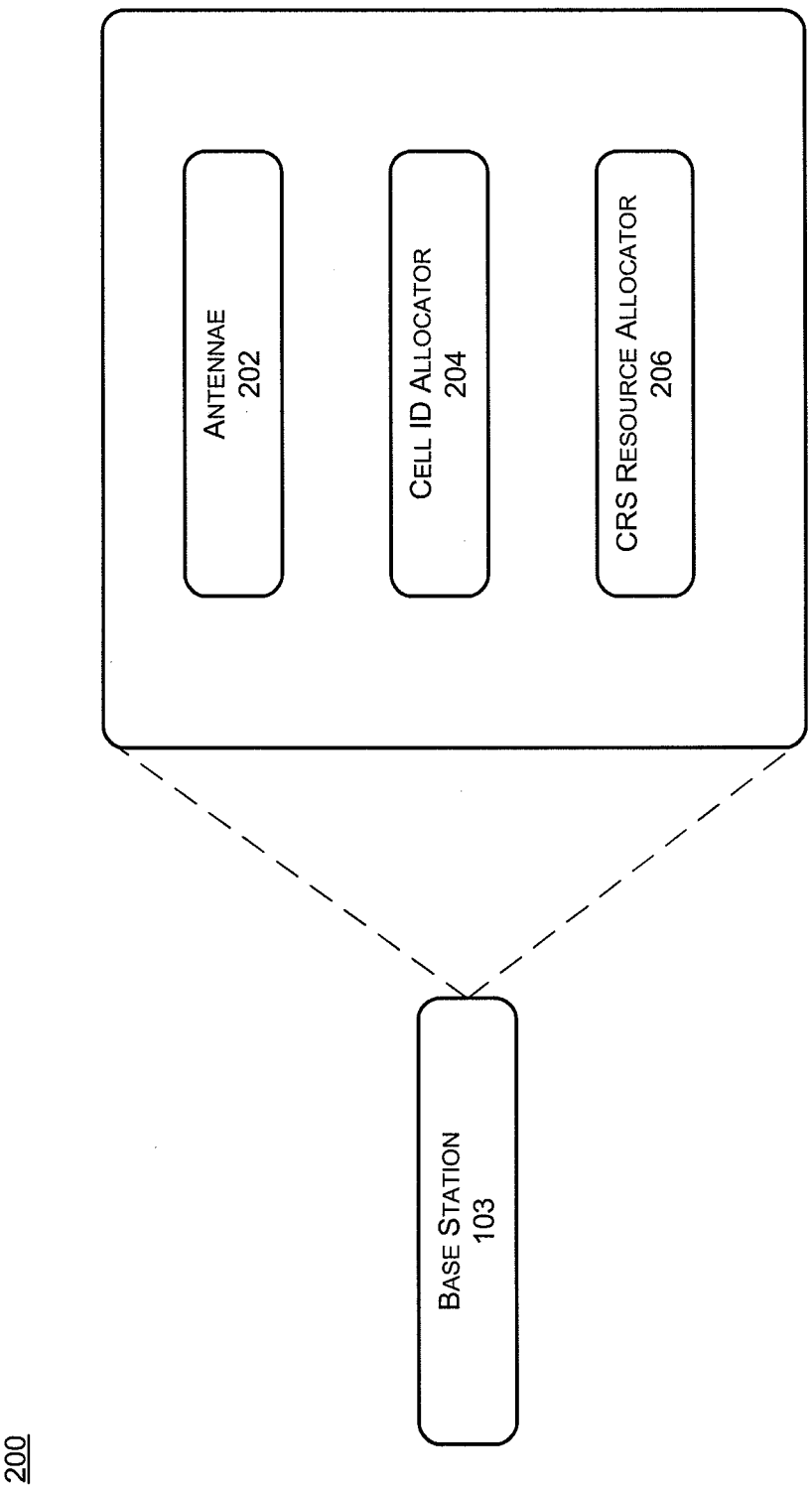
FIG. 2 shows an example base station by which cell ID allocation in a heterogeneous network may be implemented.

FIG. 2 shows an example configuration 200 of base station 103 by which cell ID allocation may be implemented, arranged in accordance with at least some embodiments described herein. As depicted, example configuration 200 of base station 103 may include, at least, one or more antennae 202, a cell ID allocator 204, and a CRS resource allocator 206.

Antennae 202 may refer to one or more components or modules, implemented as software, hardware, firmware, or any combination thereof, which may be configured to convert electric power into electromagnetic waves within a frequency band, and vice versa, and then to transmit signals for wireless communication. When transmitting radio signals, antennae 202 may radiate energy from an oscillating radio frequency electric current as electromagnetic waves. When receiving radio signals from a communication device within a respective cell or from another base station corresponding to a different cell, antennae 202 may intercept some of the power of electromagnetic waves to produce a relatively lower voltage at its terminals, at which the intercepted power may be further amplified. In at least one example, antennae 202 may be configured to transmit CRS in a frequency band determined by the cell ID of macro cell 102. That is, the frequency band may be the same as a frequency band utilized by one of micro cells 106, if the cell ID of macro cell 102 and the respective one of micro cells 106 have a same remainder of division of the cell ID by 3.

Cell ID allocator 204 may refer to a component or module, implemented as software, hardware, firmware, or any combination thereof, which may be configured to assign a cell ID to macro cell 102 and each of micro cell 105. That is, cell ID allocator 204 may be configured to first identify a series of numeric values as multiple candidate cell IDs in accordance with the wireless communication standard adopted by base station 103. For example, the numeric values that may be identified as candidate cell IDs are 0-503 in an LTE communication system. Cell ID allocator 204 may be configured to then randomly select a first cell ID, e.g., 99, from the multiple candidate cell IDs for macro cell 102. Further, cell ID allocator 204 may identify a subset of the multiple candidate cell IDs associated with the first cell ID i.e., a subset of the multiple candidate cell IDs that have a same mathematical trait, such as a same remainder of division by a predetermined number, e.g., 3. That is, the identified subset of the multiple candidate cell IDs may include candidate cell IDs that have a remainder of division by 3 same as the first cell ID, e.g., 90, 93, 96, 102, 105, etc. Cell ID allocator 204 may then be configured to select cell IDs for micro cells 106 from other candidate cell IDs excluding the identified subset, e.g., 91, 92, 94, 95, 97, 98, 100, 101, etc.

CRS resource allocator 206 may refer to a component or module, implemented as software, hardware, firmware, or any combination thereof, which may be configured to allocate a frequency band to macro cell 102 and each of micro cells 106 to transmit CRS. Such allocation may be determined by the cell ID of each cell. That is, the cells assigned with cell IDs that have a same remainder of division by a predetermined number may be allocated with a same frequency band for the transmission of CRS. Similarly, the cells assigned with cell IDs that have a different remainder of division by the predetermined number may be allocated with different frequency bands. For example, when three cell IDs, e.g., 100, 101, and 102, are assigned to three cells respectively, each cell may be allocated with a different frequency band to transmit CRS since the remainders of division of the three cell IDs by 3 are different, i.e., 1, 2, and 0, respectively. Thus, the frequency band for the transmission of CRS of micro cells 106 may be different from the frequency band for macro cell 102.

Figure 3:
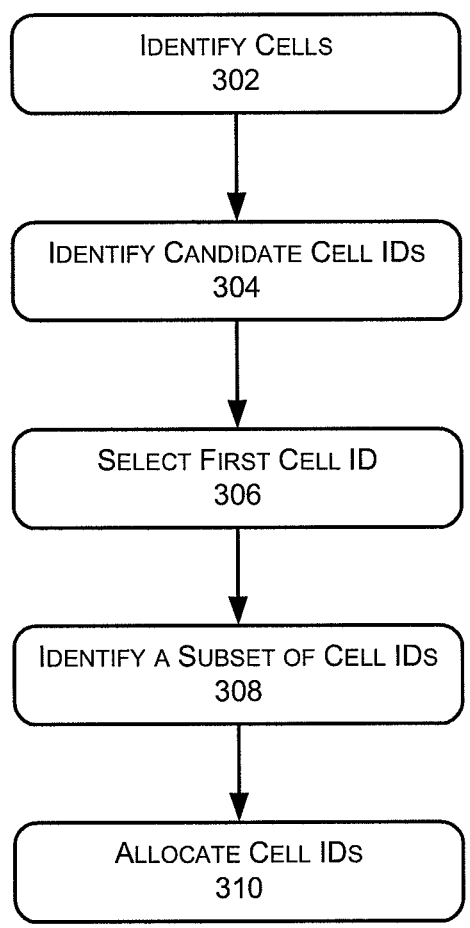
FIG. 3 shows an example configuration of a processing flow of operations by which cell ID allocation in a heterogeneous network may be implemented.

FIG. 3 shows an example configuration 300 of a processing flow of operations by which cell ID allocation in a heterogeneous network may be implemented, arranged in accordance with at least some embodiments described herein. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, and/or 310. Processing may begin at block 302.

Block 302 (Identify Cells) may refer to base station 103 identifying micro cells 106 within the coverage of macro cell 102. In at least some examples, micro cells 106 may be located in the areas where high volumes of transmission activities occur, such as shopping malls, office buildings, stadiums, etc. Block 302 may be followed by block 304.

Block 304 (Identify Candidate Cell IDs) may refer to cell ID allocator 204 identifying a series of numeric values as multiple candidate cell IDs in accordance with the wireless communication standard adopted by base station 103. For example, the candidate cell IDs are 0-503 in an LTE communication system. Block 304 may be followed by block 306.

Block 306 (Select First Cell ID) may refer to cell ID allocator 204 randomly selecting a first cell ID, e.g., 99, from the multiple candidate cell IDs for macro cell 102. Block 306 may be followed by block 308.

Block 308 (Identify a Subset of Cell IDs) may refer to cell ID allocator 204 identifying a subset of the multiple candidate cell IDs associated with the first cell ID i.e., a subset of the multiple candidate cell IDs that have a same remainder of division by a predetermined number. Further to the above example, the subset of the multiple candidate cell IDs in an LTE system may include 90, 93, 96, 102, 105, etc. Block 308 may be followed by block 310.

Block 310 (Allocate Cell IDs) may refer to cell ID allocator 204 assigning cell IDs for micro cells 106 from other candidate cell IDs excluding the identified subset. For example, cell ID allocator 204 may be configured to select cell IDs for micro cells 106 in a LTE system from 91, 92, 94, 95, 97, 98, 100, 101, etc.

Figure 4:
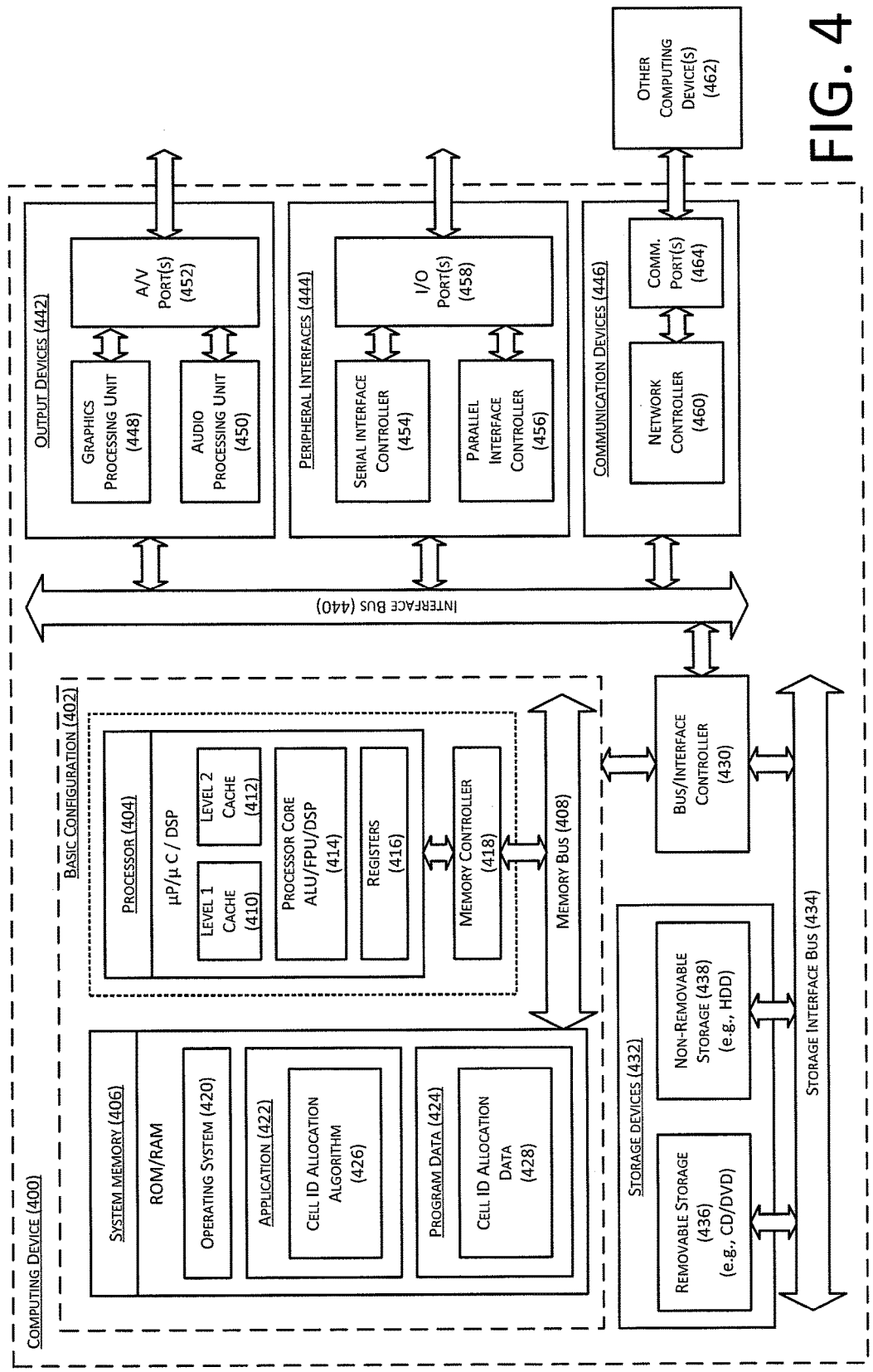
FIG. 4 shows a block diagram illustrating an example computing device that is arranged for cell ID allocation in a heterogeneous network, all arranged in accordance with at least some embodiments described herein.

FIG. 4 shows a block diagram illustrating an example computing device that is arranged for cell ID allocation in a heterogeneous network, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a cell ID allocation algorithm 426 that is arranged to perform the functions as described herein including those described with respect to process 300 of FIG. 3. Program data 424 may include cell ID allocation data 428 that may be useful for operation with cell ID allocation algorithm 426 as is described herein. In some embodiments, application 422 may be arranged to operate with program data 424 on operating system 420 such that the implementations of cell ID allocation in an LTE system may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A wireless communication system in a heterogeneous network, comprising:
    a macro cell in which wireless communications are hosted for a first set of mobile devices and multiple low power nodes that serve as proxies for a second set of mobile devices; and
    a cell identifier (ID) allocator configured to:
    identify a series of numeric values as multiple candidate cell IDs,
    randomly select a first cell ID, from the multiple candidate cell IDs, for the macro cell,
    identify a subset of the multiple candidate cell IDs associated with the first cell ID,
    determine mathematical distinction by calculating, for each of the multiple candidate cell IDs, a remainder of division of the candidate cell ID by a predetermined number,
    allocate a cell ID for each of the multiple low power nodes that has a respective mathematical distinction from the identified subset of the multiple candidate cell IDs, and
    configure each of the multiple low power nodes and the macro cell to use the allocated cell IDs to operate the wireless communication system.

2. The wireless communication system of claim 1, further comprising a resource manager configured to allocate one or more frequency resource blocks for the macro cell and the multiple low power nodes in accordance with the first cell ID and the allocated cell ID for each of the multiple low power nodes.

3. The wireless communication system of claim 1, wherein the multiple candidate cell IDs are identified in accordance with a wireless communication protocol.

4. The wireless communication system of claim 1, wherein the cell ID allocator is further configured to divide the multiple candidate cell IDs into a number of groups equal to the predetermined number.

5. The wireless communication system of claim 1, wherein the subset of the multiple candidate cell IDs associated with the first cell ID includes one or more of the multiple candidate cell IDs that have a remainder of division same as the first cell ID.

6. A method to allocate resources for wireless communication system in a heterogeneous network, comprising:
    identifying a macro cell and multiple low power nodes;
    identifying a series of numeric values as multiple candidate cell identifiers (IDs);
    randomly selecting a first cell ID, from the multiple candidate cell IDs, for the macro cell;
    identifying a subset of the multiple candidate cell IDs associated with the first cell ID;
    determining a mathematical distinction by calculating, for each of the multiple candidate cell IDs, a remainder of division of the candidate cell ID by a predetermined number;
    allocating a cell ID for each of the multiple low power nodes that has a respective mathematical distinction from the identified subset of the multiple candidate cell IDs; and
    configuring each of the multiple low power nodes and the macro cell to use the allocated cell IDs to operate the wireless communication system.

7. The method of claim 6, further comprising allocating one or more frequency resource blocks for the macro cell and the multiple low power nodes in accordance with the first cell ID and the allocated cell ID for each of the multiple low power nodes.

8. The method of claim 6, wherein the multiple candidate cell IDs are determined in accordance with a wireless communication protocol.

9. The method of claim 6, further comprising dividing the multiple candidate cell IDs into a number of groups that is equal to the predetermined number.

10. The method of claim 6, wherein the subset of the multiple candidate cell IDs associated with the first cell ID includes one or more of the multiple candidate cell IDs that have a remainder of division same as the first cell ID.

11. A non-transitory computer-readable medium having stored therein executable-instructions that, in response to execution, cause one or more processors to perform or control performance of operations comprising:
    identify a macro cell and multiple low power nodes;
    identify a series of numeric values as multiple candidate cell IDs;
    calculate, for each of the multiple candidate cell IDs, a remainder of division of the candidate cell ID by a predetermined number;
    randomly select a first cell ID, from the multiple candidate cell IDs, for the macro cell;
    divide the multiple candidate cell IDs into a number of groups that is equal to the predetermined number;
    identify, from the number of groups, a subset of the multiple candidate cell IDs associated with the first cell ID;
    allocate a cell ID for each of the multiple low power nodes that is mathematically distinct from the identified subset of the multiple candidate cell IDs,
        the mathematical distinction calculated, for each of the multiple candidate cell IDs, as the remainder of the division of the candidate cell ID by the predetermined number; and
    configure each of the multiple low power nodes and the macro cell to use the allocated cell IDs to operate a wireless communication system.

12. The non-transitory computer-readable medium of claim 11, wherein the executable-instructions further comprise instructions that, in response to execution, cause the one or more processors to perform or control performance of at least one operation comprising:
  allocate one or more frequency resource blocks for the macro cell and the multiple low power nodes in accordance with the first cell ID and the allocated cell ID for each of the multiple low power nodes.

13. The non-transitory computer-readable medium of claim 11, wherein the multiple candidate cell IDs are determined in accordance with a wireless communication protocol.

14. The non-transitory computer-readable medium of claim 12, wherein the executable-instructions further comprise instructions that, in response to execution, cause the one or more processors to perform or control performance of at least one operation comprising:
  transmit common reference signals (CRS) in the allocated one or more frequency resource blocks.

15. The non-transitory computer-readable medium of claim 13, wherein the wireless communication protocol includes long term evolution (LTE).

16. The non-transitory computer-readable medium of claim 15, wherein the macro cell includes an evolved node B in an LTE system.

17. The non-transitory computer-readable medium of claim 11, wherein the multiple low power nodes are located within coverage of the macro cell.

\* \* \* \* \*

UNITED STATES PATENT AND TRADEMARK OFFICE
CERTIFICATE OF CORRECTION

PATENT NO.         : 9,603,030 B2                          Page 1 of 1
APPLICATION NO.    : 14/438521
DATED              : March 21, 2017
INVENTOR(S)        : Huang It is certified that error appears in the above-identified patent and that said Letters Patent is hereby corrected as shown below:

On the Title Page

In Item (71), under "Applicant", in Column 1, Line 1, delete "Emprie" and insert -- Empire --, therefor.

In the Specification

In Column 1, Line 8, delete "§371" and insert -- § 371 --, therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*